Oct. 18, 1960  W. L. AMMANN  2,956,575
VALVE
Filed Feb. 27, 1957
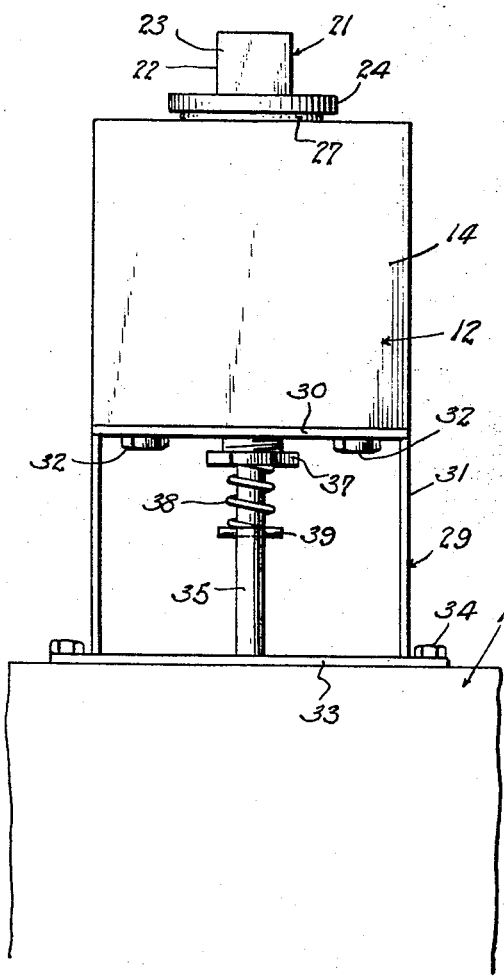
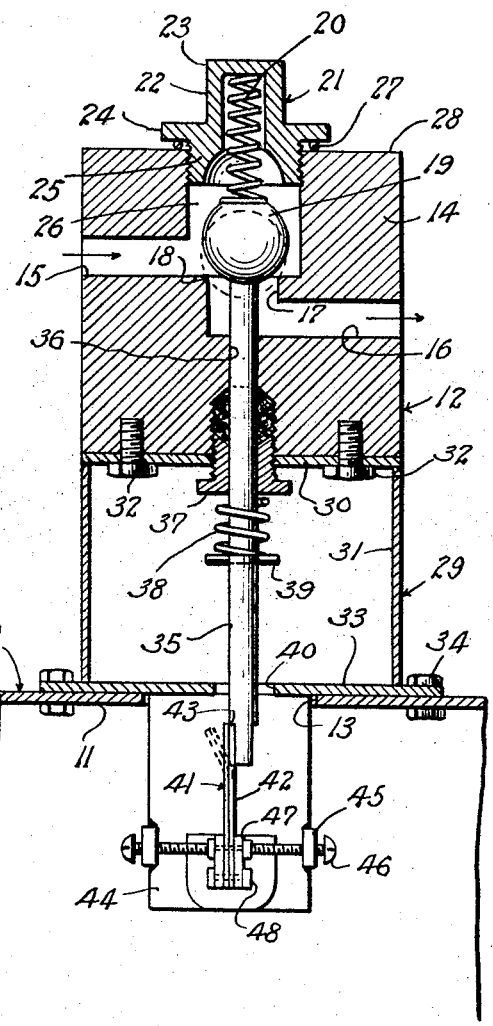
William L. Ammann
INVENTOR
BY Ashnow & Co.
ATTORNEYS.

United States Patent Office 2,956,575
Patented Oct. 18, 1960

2,956,575

VALVE

William L. Ammann, % Ammann Machine Works,
P.O. Box 153, Argonia, Kans.

Filed Feb. 27, 1957, Ser. No. 642,734

1 Claim. (Cl. 137—79)

This invention relates to a safety valve.

An object of this invention is to provide a safety valve for interposing in a fluid line wherein the valve is spring pressed to closed position, and is normally held in open position by means of a thermostatic element. When the temperature in or adjacent to the valve reaches a predetermined maximum the thermostatic element releases the valve so that the valve may move to closing position.

Another object of the invention is to provide a safety valve which is simple in construction so that it will not readily get out of order and can be produced at relatively low cost.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing:

Figure 1 is a detail side elevation of a safety valve constructed according to an embodiment of this invention.

Fig. 2 is a vertical section of the valve structure.

Referring to the drawing, the numeral 10 designates generally a container which includes a top wall 11. A safety valve structure generally indicated at 12 is mounted on the top wall 11 and the top wall 11 is provided with an opening 13 through which a portion of the valve structure 12 is adapted to project. The valve structure 12 includes a valve body 14 having an intake port 15 and an outlet port 16. The outlet port 16 is offset downwardly from the intake port 15 and a connecting passage 17 connects the ports 15 and 16. A valve seat 18 is formed at the outer end of the passage 17 and a spherical valve 19 is adapted when in closed position, to engage on the seat 18. The valve member 19 is normally urged toward the seat 18 by means of a spring 20 which at its lower end bears against the valve member 19. The spring 20 extends upwardly into a spring tensioning member generally indicated at 21. The spring tensioning member 21 is formed of a cylindrical member 22 having a top wall 23 against which the upper end of spring 20 is adapted to move.

An annular flange 24 is formed at the lower end of the cylindrical member 22 and a threaded bushing 25 extends from the flange 24 and is threaded into the upper portion of a valve chamber 26. A ring-shaped gasket 27 is interposed between the flange 24 and the upper side 28 of valve body 14.

The body 14 is supported on an inverted U-shaped member 29, the U-shaped member 29 being formed with an upper bight 30 and depending side members 31. The body 14 is secured to the bight 30 by means of bolts 32. The lower end of the side member 31 are secured to a base plate 33 which is fixed by fastening members 34 to the container top wall 11. A valve opening rod 35 is slidable in a bore 36 formed in the body 14 and the rod 35 slidably engages through a sealing bushing 37 which is threaded into the lower portion of body 14. A spring 38 engages about the rod 35 and at its outer end bears against gland 37. The lower end of spring 38 bears against a transversely disposed pin 39 and extends through the rod 35. The base 33 is provided with an opening 40 through which the rod 35 loosely engages so that the lower end of rod 35 may be disposed within the upper portion of container 11. In order to provide a means whereby rod 35 may be held in an upper front opening posititon I have provided a thermostatic means generally indicated at 41. The thermostatic means 41 includes a bi-metallic member 42 which is vertically disposed and at its upper end engages against a shoulder 43 which is formed in the lower portion of rod 35. The lower end of the thermostatic member 41 is supported by means of a depending arm or plate 44 which extends downwardly from base 33 through opening 13.

A pair of ears 45 project from plate 44 and a pair of bolts 46 are threaded through the ears 45. The inner confronting ends of bolts 46 bear against a pair of clamping plates 47 positioned on opposite sides of thermostatic member 41. The plates 47 are also secured together and to the lower portion of thermostatic member 41 by means of a rivet or securing member 48. The bolts 46 provide a means whereby the thermostatic member may be alternately adjusted so that the valve opening rod 35 may be closely regulated as to its release of valve member 19 in order that valve member 17 may be moved by spring 20 to a closed position.

What is claimed is:

A safety valve comprising a housing having an intake port and an outlet port, a valve chamber between said ports, a valve seat in said chamber, a spring pressed ball valve plug normally disengaging said seat, a valve opening rod slidably carried by a sealing bushing in said housing beneath said ball valve plug, one end of said rod engaging against said plug and the other end of said rod extending from said housing and formed with a shoulder, a bimetallic thermostatic strip, means supporting said strip whereby one end thereof releasably seats against said shoulder to normally hold said rod in valve opening position, a transverse pin extending through the extending end of said rod, a spring between said pin and the bottom of said sealing bushing biasing said shoulder towards said strip, and screw means bearing against opposite sides of said strip for adjusting said thermostatic strip to discharge said shoulder at one of a variety of temperatures.

References Cited in the file of this patent

UNITED STATES PATENTS

| | | |
|---|---|---|
| 1,632,144 | Nemec | June 14, 1927 |
| 1,982,582 | Lovekin | Nov. 27, 1934 |
| 2,131,094 | Clark | Sept. 27, 1938 |
| 2,524,667 | Jenkins | Oct. 3, 1950 |
| 2,607,225 | Biscoe | Aug. 19, 1952 |
| 2,608,353 | Cobb | Aug. 26, 1952 |
| 2,637,333 | Houston | May 5, 1953 |
| 2,724,972 | Drow | Nov. 29, 1955 |